United States Patent
Hatate et al.

(10) Patent No.: US 8,404,431 B1
(45) Date of Patent: Mar. 26, 2013

(54) METHOD FOR MANUFACTURING THIN-FILM MAGNETIC HEAD

(75) Inventors: Hitoshi Hatate, Tokyo (JP); Hisayoshi Watanabe, Tokyo (JP); Masachika Hashino, Tokyo (JP); Koichi Otani, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/289,369

(22) Filed: Nov. 4, 2011

(51) Int. Cl.
*G02B 5/127* (2006.01)
(52) U.S. Cl. .................. 430/320; 216/22; 29/603.16
(58) Field of Classification Search .................. None
See application file for complete search history.

(56) References Cited

U.S. PATENT DOCUMENTS

| | | | |
|---|---|---|---|
| 7,639,451 B2 | 12/2009 | Yatsu et al. | |
| 2008/0144215 A1* | 6/2008 | Hsiao et al. | 360/119.04 |
| 2010/0077600 A1* | 4/2010 | Seki et al. | 29/603.09 |
| 2010/0162556 A1* | 7/2010 | Guruz et al. | 29/603.16 |
| 2011/0090595 A1 | 4/2011 | Hirata et al. | |

FOREIGN PATENT DOCUMENTS

JP   2007-257815   10/2007

OTHER PUBLICATIONS

U.S. Appl. No. 13/176,134, filed Jul. 5, 2011, Watanabe, et al.

* cited by examiner

*Primary Examiner* — John A. McPherson
(74) *Attorney, Agent, or Firm* — Oblon, Spivak, McClelland, Maier & Neustadt, L.L.P.

(57) ABSTRACT

A method for manufacturing a thin-film magnetic head includes processes of forming a polishing position sensor and a recording head portion alongside on one side of a wafer. The process of forming the recording head portion has a step of performing a photolithography process after applying an alkali soluble resin film and a photoresist film in the named order. The process of forming the polishing position sensor has a step of performing a photolithography process on the photoresist film while having only the photoresist film out of the alkali soluble resin film and the photoresist film.

3 Claims, 16 Drawing Sheets

METHOD FOR MANUFACTURING THIN-FILM MAGNETIC HEAD

TECHNICAL FIELD

The present invention relates to a method for manufacturing a thin-film magnetic head.

BACKGROUND OF THE INVENTION

In complex-type thin-film magnetic heads having both a recording head for magnetically recording information on a recording medium and a reproducing head for magnetically reading out information recorded on the recording medium, a neck height (throat height) and an MR height are critical factors contributing to recording performance of the recording head and reproducing performance of the reproducing head. They are each measured based on and along a direction away from an air bearing surface.

To manufacture the complex-type thin-film magnetic heads, a wafer is formed with a number of magnetic head elements aligned thereon, and after a bar having a plurality of magnetic head elements aligned in one direction is obtained by cutting the wafer along an alignment direction of the magnetic head elements, one end face of the bar is polished. Thus, along with formation of the air bearing surface, the neck height of the recording head and the MR height of the reproducing head can be adjusted to a predetermined size. Then, finished magnetic heads can be obtained by cutting the bar at intervals into individual magnetic head elements.

Regarding a process of manufacturing a complex-type thin-film magnetic head, a variety of techniques have been proposed to control the polishing amount during the polishing process for the air bearing surface. Specifically, for example, Japanese Unexamined Patent Application Publication No. 11-000863 discloses a technique in which a polishing position sensor for monitoring is formed in an aggregate of magnetic heads during formation of the aggregate of magnetic heads so that the polishing process can be performed while measuring the neck height of the recording head portion and the MR height of the reproducing head portion with the polishing position sensor.

Since the polishing position sensor should serve as a reference point for setting the neck height and the MR height, any displacement, relative to the head portion is not allowed in the manufacturing process. When performing photolithography or the like, therefore, the head portion including both the recording head portion and the reproducing head portion and the polishing position sensor are formed at the same time using a common mask.

However, since the polishing position sensor and the head portion have different requirements in terms of functions and characteristics, their different requirements cannot be met by forming them in a common process from start to finish.

In thin-film magnetic heads, as disclosed in Japanese Unexamined Patent Application Publication No. 2007-257815, for example, an end face of a main magnetic pole (recording magnetic pole) appearing at the air bearing surface is shaped to have a bevel angle so as to prevent so-called "side-erasing", i.e., overwriting of adjacent tracks. The bevel angle is set such that the end face of the main magnetic pole has a larger width at a trailing side. Conversely, it must have an inverted triangular shape or an inverted trapezoidal shape having a smaller width at a leading side. However, this reduces a sectional area of the main magnetic pole to degrade writing performance.

Moreover, since the main magnetic pole of the thin-film magnetic head has a large-width portion and a small-width portion in such an arrangement as to send a magnetic flux from the large-width portion to the small-width portion, the magnetic flux from the large-width portion concentrates on the small-width portion. This easily causes magnetic saturation or magnetic flux leakage at the small-width portion, hindering improvement in writing performance.

As one means for improving writing performance by suppressing magnetic saturation and unnecessary magnetic flux leakage at the recording head portion while preventing side-erasing, accordingly, there has been proposed a technique of increasing the sectional area of the recording magnetic pole of the recording head portion such that a resist layer for defining a pattern of the head portion has a two-layer structure consisting of a PMGI (polydimethyl glutarimide) layer and a photoresist layer and the photoresist has a vertical slope at the bottom by utilizing the nature of PMGI.

In this method, the recording head portion and the polishing position sensor are formed through the same photolithography process. At the recording head portion, the slope of the photoresist is made vertical at the bottom by controlling its developing time. In this case, the PMGI layer beneath the photoresist is further developed at the polishing position sensor, causing a so-called undercut. Since the occurrence of undercut means that the polishing position sensor is deformed to move the reference point, there is a risk of impairing intended functions of the polishing position sensor.

SUMMARY OF THE INVENTION

It is an object of the present invention to provide a method for manufacturing a thin-film magnetic head capable of maintaining a relative position of a polishing position sensor to a head portion with high precision.

It is another object of the present invention to provide a method for manufacturing a thin-film magnetic head capable of improving writing performance by suppressing magnetic saturation and unnecessary magnetic flux leakage while preventing side-erasing.

In order to achieve the above object, a method for manufacturing a thin-film magnetic head according to the present invention comprises processes of forming a polishing position sensor and a recording head portion alongside on one side of a wafer. The process of forming the recording head portion has a step of performing a photolithography process after applying an alkali soluble resin film and a photoresist film in the named order.

The process of forming the polishing position sensor has a step of performing a photolithography process on the photoresist film while having only the photoresist film out of the alkali soluble resin film and the photoresist film.

In the thin-film magnetic head manufacturing method according to the present invention, since the process of forming the recording head portion has a step of performing a photolithography process on an alkali soluble resin film and a photoresist film after applying the alkali soluble resin film and the photoresist film in the named order, a sectional area of a magnetic pole film of the recording head portion can be increased by providing the photoresist with a vertical surface at the bottom side through the use of the alkali soluble resin film.

On the other hand, since the process of forming the polishing position sensor has a step of performing a photolithography process on the photoresist film while having only the photoresist film out of the alkali soluble resin film and the photoresist film, the photoresist film forms a single-layer resist mask. The alkali soluble resin film, which leads to occurrence of an undercut, does not exist. Thus, the relative position of the polishing position sensor to the recording head portion can be maintained with high precision. Typically, the alkali soluble resin film is PMGI.

The other objects, constructions and advantages of the present invention will be further detailed below with reference to the attached drawings. However, the attached drawings show only illustrative examples.

DESCRIPTION OF THE PREFERRED EMBODIMENTS

First of all, description will be made about a typical thin-film magnetic head to which the manufacturing method according to the present invention can be applied. However, the present invention is not limited to the use for the illustrated thin-film magnetic head but can be applied to various types of heads having a polishing position sensor, along with a recording head portion, which serves as a reference point for polishing during its manufacturing process.

Figure 1:
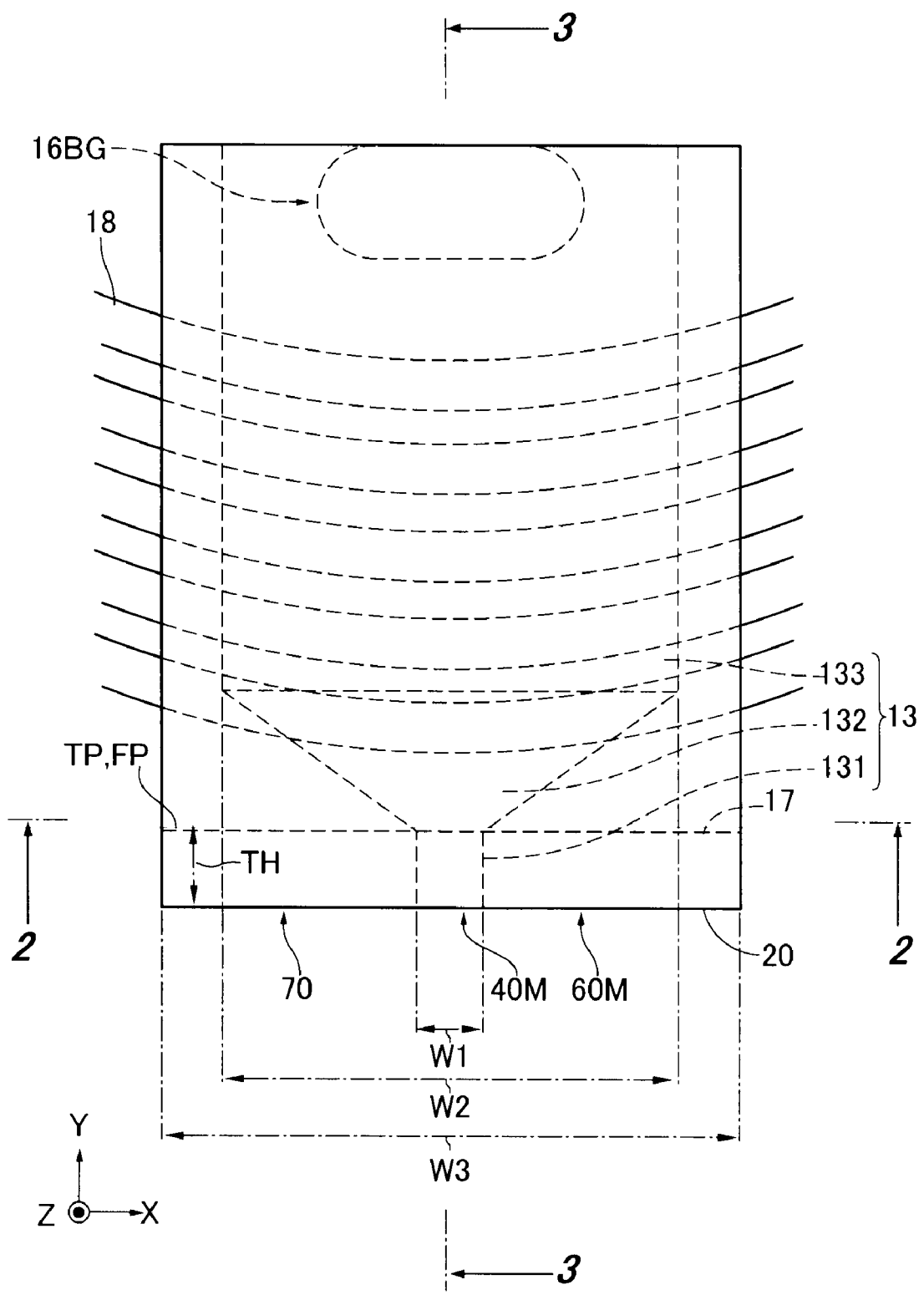
FIG. 1 is a plan view showing a part of a recording magnetic pole of a thin-film magnetic head to which the present invention can be applied.
Figure 2:
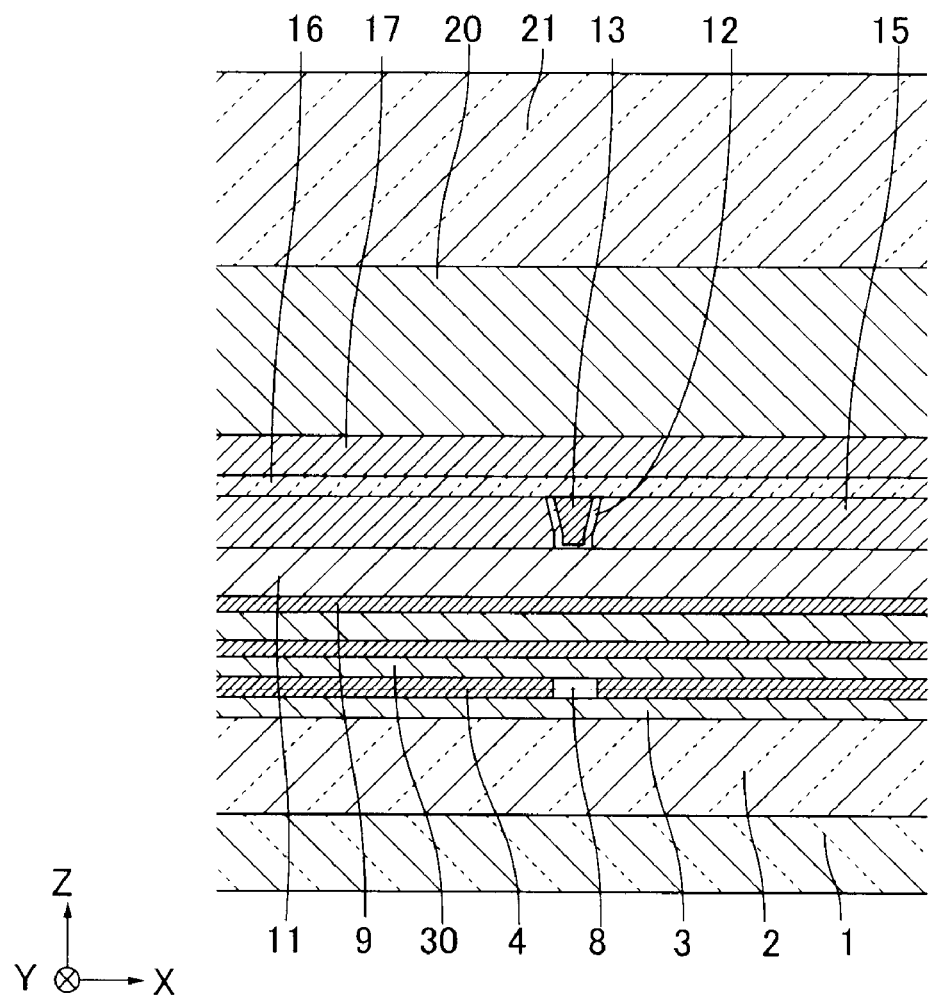
FIG. 2 is a sectional view taken along line 2-2 in FIG. 1.
Figure 3:
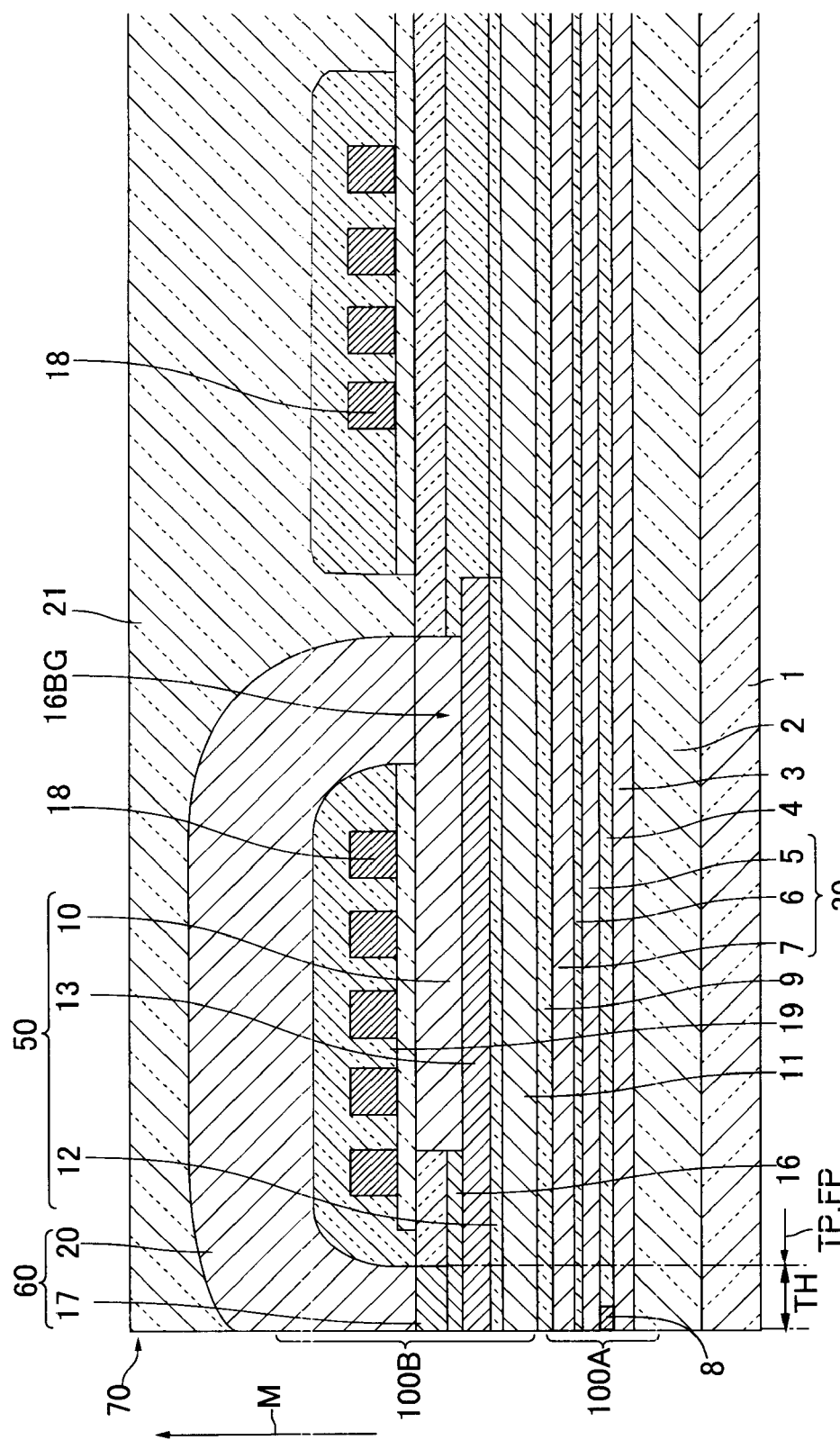
FIG. 3 is a sectional view taken along line 3-3 in FIG. 1.

In FIGS. 1 to 3, for the convenience of description, dimensions along X, Y and Z axes are called "width", "length" and "thickness/height", respectively. Along the Y axis, moreover, one side close to an air bearing surface 70 and the other side remote therefrom are designated by "front" and "rear", respectively, and being positioned forward and being positioned rearward may be expressed by "project" and "recede", respectively.

The illustrated thin-film magnetic head is a complex-type head which can perform recording/reproducing of magnetic information in association with a magnetic recording medium (hard disk). In the thin-film magnetic head, an insulating layer 2, a reproducing head portion 100A for performing a reproducing process using magneto-resistive effect (MR effect), a separating layer 9, a recording head portion 100B for performing a recording process in a perpendicular recording method, and an overcoat layer 21 are stacked in the named order on a slider substrate 1 comprising, for example, a non-magnetic insulating material such as AlTiC.

The insulating layer 2, the separating layer 9 and the overcoat layer 21 comprise, for example, a non-magnetic insulating material such as aluminium oxide ($Al_2O_3$).

The reproducing head portion 100A is formed, for example, by stacking a lower read shield layer 3, a shield gap film 4, and an upper read shield layer 30 in the named order. In the shield gap film 4, a reproducing element 8 is embedded in such a manner as to be exposed on the air bearing surface 70 to be opposed to the recording medium.

Both the lower read shield layer 3 and the upper read shield layer 30 magnetically separate the MR element 8 from the surroundings and extend rearward from the air bearing surface 70. The lower read shield layer 3 comprises, for example, a soft magnetic material such as a nickel-iron alloy (NiFe (e.g., 80 wt. % of Ni and 20 wt. % of Fe): hereinafter merely referred to as "permalloy (trade name)"). The upper read shield layer 30 is formed, for example, by stacking two upper read shield layer portions 5, 7 with a non-magnetic film 6 interposed therebetween. Both the upper read shield layer portions 5, 7 comprise, for example, a soft magnetic material such as a permalloy. The non-magnetic film 6 comprises, for example, a non-magnetic material such as ruthenium (Ru) or alumina. The upper read shield layer 30 is not necessarily required to have a multilayer structure but may have a single-layer structure of a magnetic material.

The shield gap film 4 electrically separates the MR element 8 from the surroundings and comprises, for example, a non-magnetic insulating material such as alumina. The MR element 8 uses giant magneto-resistive effect (GMR) or tunneling magneto-resistive effect (TMR), for example. The height of the MR element 8, i.e., the dimension from a front end (edge exposed on the air bearing surface) to a rear end (edge remote from the air bearing surface) of the MR element 8 is an MR height which is a critical factor contributing to reproducing performance of the thin-film magnetic head.

The recording head portion 100B is, for example, a perpendicular magnetic recording head, i.e., a so-called shield-type head formed by stacking a magnetic pole film 50 embedded in a first support layer 11 and a second support layer 15, a gap film 16 having an opening (back gap 16BG) for magnetic connection, a thin-film coil 18 embedded in an insulating film 19, and a magnetic film 60 in the named order.

The magnetic pole film 50 leads a magnetic flux to the recording medium and, for example, extends rearward from the air bearing surface 70. The magnetic pole film 50 is formed, for example, by stacking an auxiliary magnetic pole film 10, a non-magnetic film 12 and a recording magnetic pole film 13 in the named order.

The auxiliary magnetic pole film 10, for example, extends from behind the air bearing surface 70 to the hack gap 16BG. The auxiliary magnetic pole film 10 is, for example, disposed on the leading side with respect to the recording magnetic pole film 13 and has a rectangular plan shape (width W2), as shown in FIG. 1. The support layer 11 electrically and magnetically separates the auxiliary magnetic pole film 10 from the surroundings and comprises, for example, a non-magnetic insulating material such as alumina.

The non-magnetic film 12 is a first non-magnetic film electrically and magnetically separating the recording magnetic pole film 13 from the surroundings. The non-magnetic film 12, for example, extends from the air bearing surface 70 to the forefront position of the auxiliary magnetic pole film 10 for connecting the auxiliary magnetic pole film 10 and the recording magnetic pole film 13 to each other and comprises a non-magnetic insulating material such as alumina or aluminium nitride. However, the range over which the non-magnetic film 12 extends may be set arbitrarily. The section of the non-magnetic film 12 parallel to the air bearing surface 70 is U-shaped, and the recording magnetic pole film 13 is partially embedded in the non-magnetic film 12. Particularly, the non-magnetic film 12 includes a non-magnetic film formed by an ALD (atomic layer deposition) process, for example, and has a uniform thickness along the periphery (bottom face and both side faces) of the recording magnetic pole film 13.

The second support layer 15 is embedded outside the non-magnetic film 12 and comprises, for example, a non-magnetic insulating material such as alumina. In the case of employing a side-shield structure, alternatively, it may comprise a magnetic material.

The recording magnetic pole film 13 is a main magnetic flux-emitting portion and extends, for example, from the air bearing surface 70 to the back gap 16BG. As shown in FIG. 1, the recording magnetic pole film 13 includes small-width portions 131, 132 and a large-width portion 133 and has a table tennis racket-like plan shape as a whole. More specifically, it has a small-width portion composed of the first and second small-width portions 131, 132 and the large-width portion 133 in the named order from the air bearing surface 70. The first small-width portion 131 is a substantial magnetic flux-emitting portion and has a constant width W1 which defines a recording track width. The second small-width portion 132 is a portion from which a magnetic flux is supplied to the first small-width portion 131. The second small-width portion 132 is continuous, at its rear end, with the large-width portion 133 having a constant width (W2) and gradually narrows forward toward the first small-width portion 131. When the recording magnetic pole film 13 is seen from the air bearing surface 70, however, the second small-width portion 132 can be construed as a width-increasing portion. The position where the width of the recording magnetic pole film 13 starts to increase from W1 to W2 is a so-called flare point FP. The width W1 is equal to or less than about 0.2 μm.

Although not illustrated, the recording magnetic pole film 13 includes a seed layer and a plating layer formed on the seed layer. The seed layer is used to let the plating layer grow in a thin-film magnetic head manufacturing process and comprises, for example, a magnetic material similar to that of the plating layer. The plating layer comprises, for example, a magnetic material having a high saturation magnetic flux density such as a nickel-iron alloy (FeNi) or an iron-based alloy. Examples of the iron-based alloy include an iron-cobalt alloy (FeCo) and an iron-cobalt-nickel alloy (FeCoNi).

The gap film 16 is a gap for magnetically separating the recording magnetic pole film 13 from the magnetic film 60 and comprises, for example, a non-magnetic insulating material such as alumina or a non-magnetic conductive material such as ruthenium. The gap film 16 has a thickness of about 0.03 μm to 0.1 μm.

The thin-film coil 18 generates a magnetic flux and comprises, for example, a highly conductive material such as copper (Cu). The thin-film coil 18 is wound around the back gap 16BG to have a winding structure (or spiral structure).

The insulating film 19 electrically separates the thin-film coil 18 from the surroundings and comprises, for example, a non-magnetic insulating material such as a thermosetting photoresist or a spin on glass (SOG). The forefront position of the insulating film 19 is a throat height zero position TP, and the distance between the throat height zero position TP and the air bearing surface 70 is a throat height TH which is a critical factor determining recording characteristics. For example, FIG. 1 shows a case where the throat height zero position TP matches the flare point FP.

The magnetic film 60 absorbs a spreading component of a magnetic flux emitted from the recording magnetic pole film 13 toward the recording medium so as to increase the gradient of the perpendicular magnetic field and also absorbs a magnetic flux after recording so as to circulate the magnetic flux between the recording head portion 100B and the recording medium. The magnetic film 60, which extends rearward from the air bearing surface 70 on the trailing side of the recording magnetic pole film 13, is separated from the recording magnetic pole film 13 by the gap film 16 at its front but connected to the recording magnetic pole film 13 through the back gap 16BG at its rear. On the side close to the air bearing surface 70, the magnetic film 60 has an end face 60M which is, for example, of a rectangular shape having a width W3 larger than the width W1, as shown in FIG. 1. The magnetic film 60 includes, for example, a write shield layer 17 and a return yoke layer 20 which are distinct from each other.

The write shield layer 17 mainly has a function of increasing the gradient of the perpendicular magnetic field and comprises, for example, a magnetic material having a high saturation magnetic flux density such as a permalloy or an iron-based alloy. Particularly by absorbing a spreading component of a magnetic flux emitted from the recording magnetic pole film 13, the write shield layer 17 (1) increases the magnetic field gradient of the perpendicular magnetic field, (2) decreases the recording width, and (3) incorporates an oblique magnetic field component into the perpendicular magnetic field. However, the write shield layer 17 may also have a function of circulating the magnetic flux like the return yoke layer 20. As shown in FIG. 3, for example, the write shield layer 17 is disposed adjacent to the gap film 16 and extends rearward from the air bearing surface 70 to have its rear end adjacent to the insulating film 19. Thus, the write shield layer 17 serves to define the forefront position (throat height zero position TP) of the insulating film 19.

The return yoke layer 20 has a function of circulating the magnetic flux and comprises, for example, a magnetic material similar to that of the write shield layer 17. The return yoke layer 20 extends from the air bearing surface 70, through above the insulating film 19, to the back gap 16BG on the trailing side of the write shield layer 17 and is connected to the write shield layer 17 at its front but connected to the recording magnetic pole film 13 at its rear through the back gap 16BG, as shown in FIG. 3.

The overcoat layer 21 protects the thin-film magnetic head and comprises, for example, a non-magnetic insulating material such as alumina.

Figure 4:
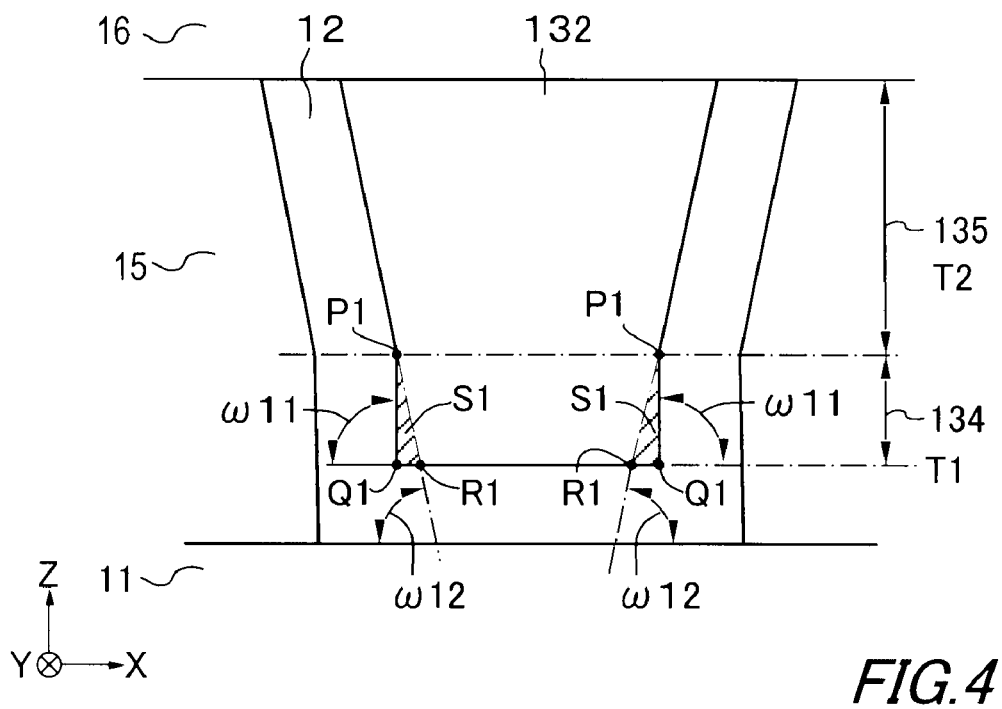
FIG. 4 is a drawing showing a part of the sectional view of FIG. 2 on an enlarged scale.
Figure 5:
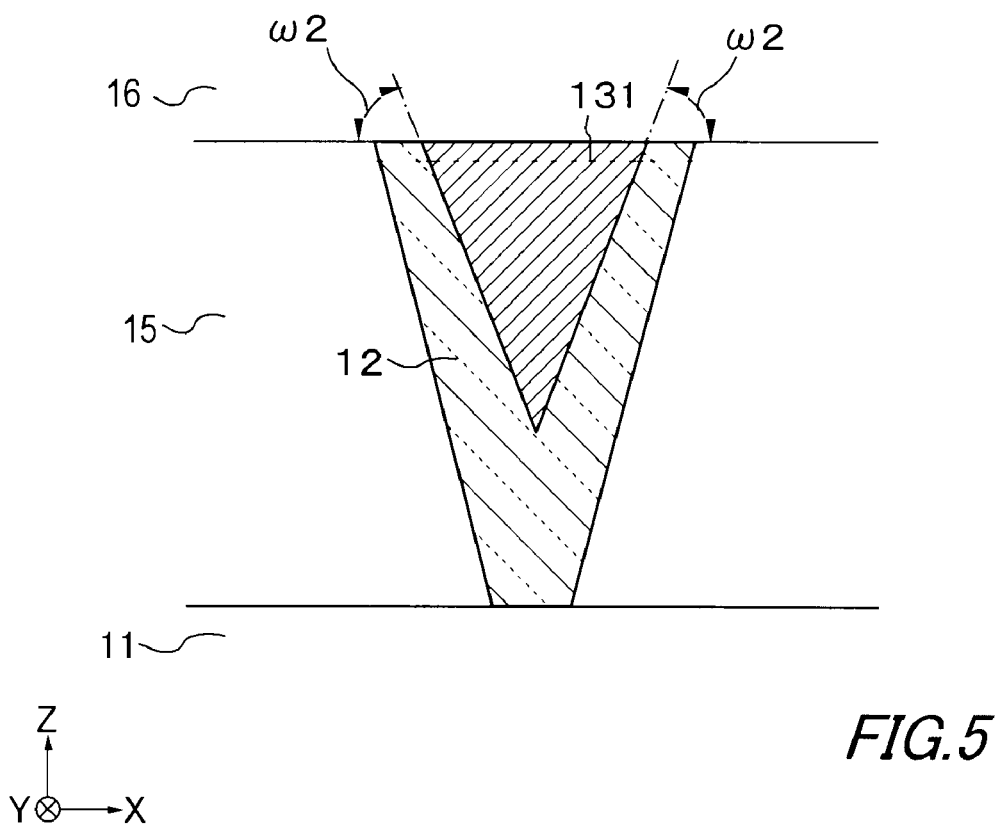
FIG. 5 is an enlarged view of a magnetic pole end face as seen from an air bearing surface.

Moreover, FIG. 4 is a drawing showing a part of the sectional view taken along line 2-2 in FIG. 1 on an enlarged scale, while FIG. 5 is an end view at the air bearing surface 70. The recording magnetic pole film 13 has a large-width portion 133, a second small-width portion 132 and a first small-width portion 131 continuously arranged in the named order toward the air bearing surface 70, wherein the second small-width portion 132 and the first small-width portion 131 have a smaller width than the large-width portion 133. More specifically, the width of the second small-width portion 132 gradually decreases toward the first small-width portion 131 having the width W1 in a substantially laterally symmetrical manner from both lateral ends of the large-width portion 133 having the width W2. With this structure, a magnetic flux can be efficiently supplied from the large-width portion 133 to the first small-width portion 131 which serves as a recording magnetic pole.

Of the large-width portion 133, the first small-width portion 131 and the second small-width portion 132 constituting the recording magnetic pole film 13, at least the second small-width portion 132 has a first portion 134 having a thickness T1 and a second portion 135 having a thickness T2.

The first portion 134 extends upward from a bottom face adjacent to the first support layer 11 while the second portion 135 is continuous with an upper end of the first portion 134 and has both side faces inclined at an external angle ω 12 in such a direction as to increase the width. An external angle ω 11 of the first portion 134 formed by a plane parallel to the bottom face and the side face is larger than the external angle ω 12 of the second portion 135 formed by a plane parallel to the bottom face and the side face.

In the prior art, the second portion 135 extends continuously to the bottom face at a constant external angle ω 12, as indicated by line P1-R1 in FIG. 4. As compared with such a conventional structure, the sectional area of the first portion 134 increases by twice the triangular area S1 defined by points P1, R1 and Q1, so that writing performance can be improved not only by reducing leakage of a magnetic flux supplied from the large-width portion 133 to the second small-width portion 132 but also by avoiding magnetic saturation at the second small-width portion 132. The external angle ω 11 of the first portion 134 formed by a plane parallel to the bottom face and the side face is typically an angle at which the first portion 134 extends upward with a constant width, i.e., 90 degrees.

Referring next to FIG. 5 showing the end face of the first small-width portion 131 at the air bearing surface 70, the front end face of the first small-width portion 131 appearing at the tip of the recording magnetic pole film 13 has an inverted triangle shape having an external angle ω2. The external angle ω2 is a bevel angle that is relevant to magnetic recording, and "side-erasing", i.e., overwriting of adjacent tracks can be prevented because of the bevel angle ω2. Side-erasing depends on the shape of the magnetic pole end face, and an excellent side-erasing preventing effect can be expected in the embodiment in which it has an inverted triangle shape having a bevel angle ω2. Any section of the first small-width portion 131 taken parallel to the air bearing surface 70 has the inverted triangle shape shown in FIG. 5.

Next will be described a method for manufacturing the foregoing thin-film magnetic head. Basically, it can be manufactured by forming and stacking a series of components in order using a conventional thin-film process including a film formation technique such as plating or sputtering, a patterning technique such as photolithography, an etching technique such as dry etching or wet etching, and a polishing technique such as chemical mechanical polishing (CMP).

To explain with reference to FIGS. 1 to 3, the reproducing head portion 100A is formed such that at first the insulating layer 2 is formed on the slider substrate 1, and then the lower read shield layer 3, the shield gap film 4 embedded with the MR element 8 and the upper read shield layer 30 (the upper read shield layer portions 5, 7 and the non-magnetic film 6) are stacked on the insulating layer 2 in the named order.

Then, the recording head portion 100B is formed such that after the insulating layer 9 is formed on the reproducing head portion 100A, the magnetic pole film 50 (the auxiliary magnetic pole film 10, the non-magnetic film 12 and the recording magnetic pole film 13) embedded in the support layers 11, 15, the gap film 16, the thin-film coil 18 embedded in the insulating film 19, and the magnetic film 60 (the write shield layer 17 and the return yoke layer 20) are stacked on the insulating layer 9 in the named order. Finally, after the overcoat layer 21 is formed on the recording head portion 100B, the thin-film magnetic head is completed by forming the air bearing surface 70 using a machining process or a polishing process.

Of the series of manufacturing processes, the manufacturing method according to the present invention has a distinctive feature in processes of manufacturing the recording magnetic pole film 13 and a polishing position sensor 80. Their manufacturing processes will be described with reference to FIGS. 6 to 15. All manufacturing processes illustrated in these figures are conducted on a wafer.

Figure 6:
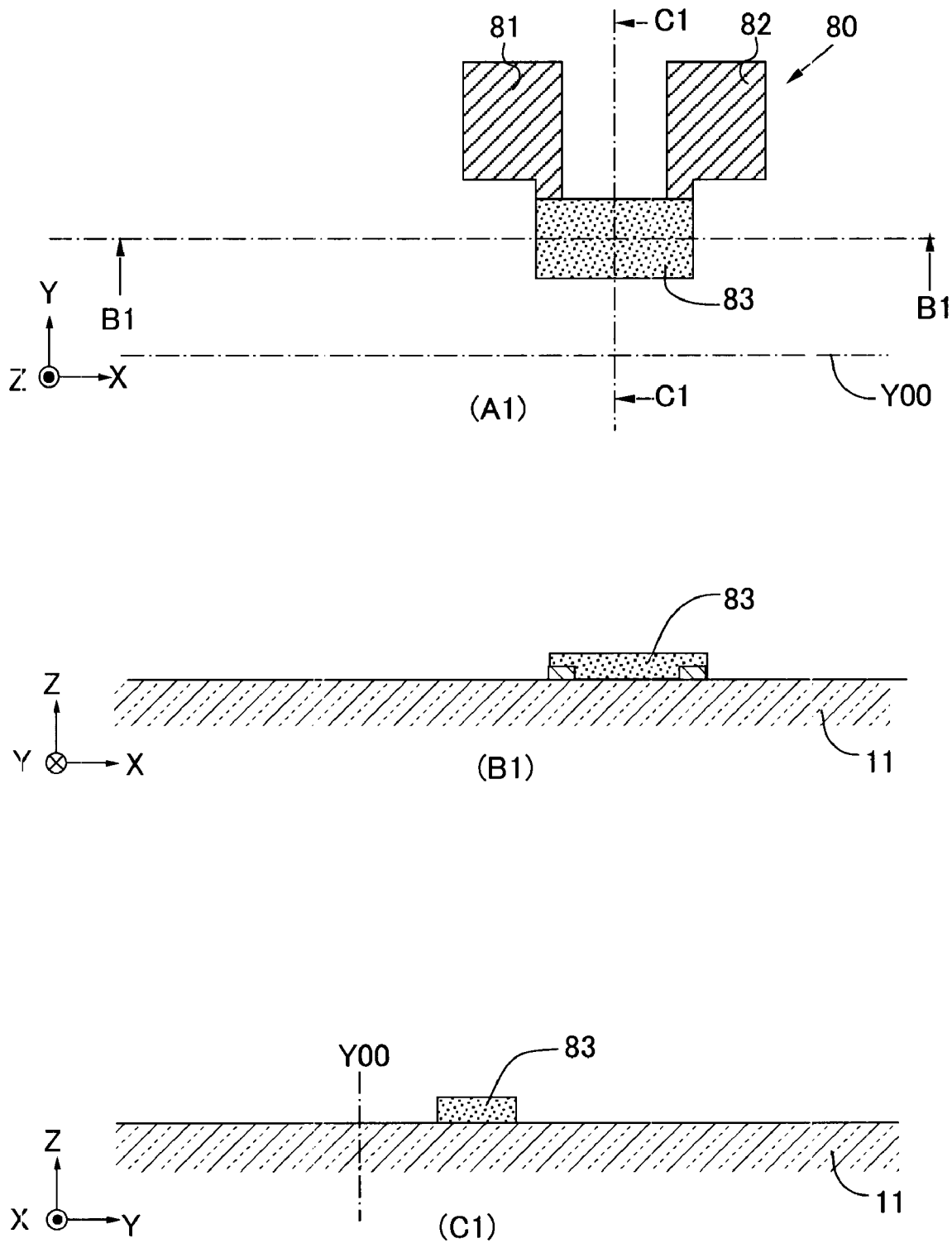
FIG. 6 is a drawing showing a process of a thin-film magnetic head manufacturing method according to the present invention.

Prior to detailed description, individual views and their positional relationships in FIGS. 6 to 15 will be explained below. In FIG. 6, at first, FIG. 6(A1) is a plan view showing a part of a wafer after formation of the first support layer 11, FIG. 6(B1) is a sectional view taken along line B1-B1 in FIG. 6(A1), and FIG. 6(C1) is a sectional view taken along line C1-C1 in FIG. 6(A1). FIGS. 7 to 15 have similar views and positional relationships. In FIGS. 7 to 15, accordingly, FIGS. 7(A1) to 15(A1) are plan views, FIGS. 7(B1) to 15(B1) are sectional views taken along line B1-B1 in FIGS. 7(A1) to 15(A1), and FIGS. 7(C1) to 15(C1) are sectional views taken along line C1-C1 in 7(A1) to 15(A1). The reference symbol Y00 indicates a boundary line between adjacent groups of magnetic head elements in the Y-axis.

At first, as shown in FIGS. 6(A1) to 6(C1), electrode metallic films 81, 82 and a resistance film 83 for the polishing position sensor 80 are formed on one side of a support layer 11 formed on a wafer which becomes a slider substrate. A number of such are arranged at intervals in the direction of the X-axis and in the direction of the Y-axis on the wafer. This figure shows only one of them.

The electrode metallic films 81, 82 are arranged alongside at a distance from each other. Their manufacturing process is such that after a resist mask is formed, for example, by a photolithography process, a low-electrical resistance metallic thin-film such as Au or Cu is formed by a sputtering deposition process and then the resist mask is removed by a lift-off process and the remaining metallic thin-film is patterned by milling. The electrode metallic films 81, 82 and the resistance film 83 may have various patterns. The illustrated pattern is a mere example and they are not limited to the shape.

The resistance film 83 is formed to connect the electrode metallic films 81, 82. The resistance film 83 comprises a material having a high resistance and a good corrosion resistance as compared with the material of the electrode metallic films 81, 82, e.g., at least one of Ru, Ta, W and NiFe. The resistance film 83 has a film thickness of about 5 to 50 nm. Such a resistance film 83 can be formed by applying a photolithography process, a sputtering deposition process and a lift-off process in order.

Figure 7:
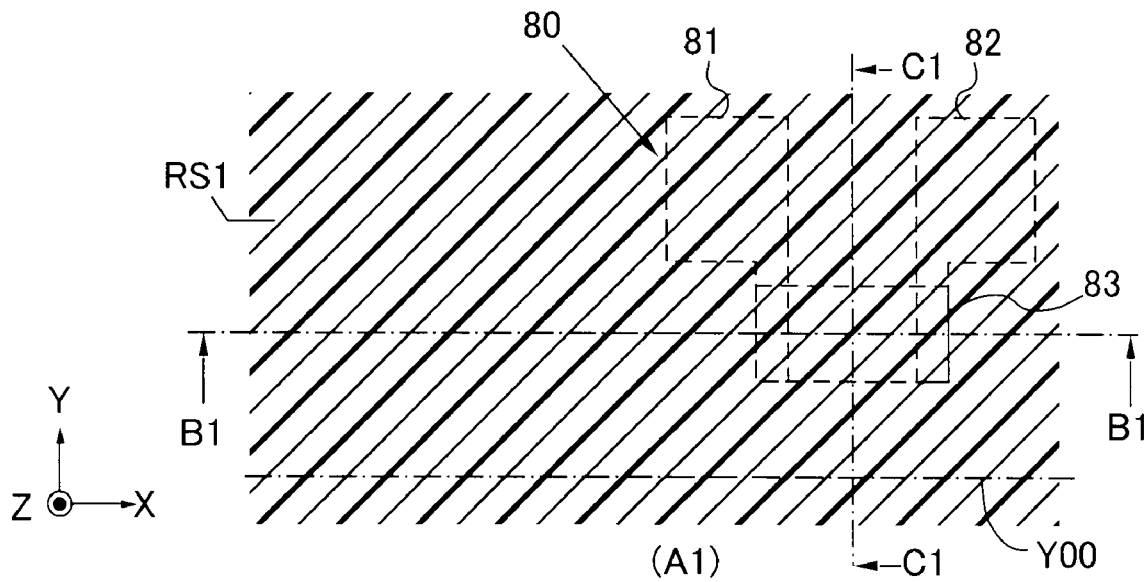
FIG. 7 is a drawing showing a process after the process shown in FIG. 6.
Figure 7:
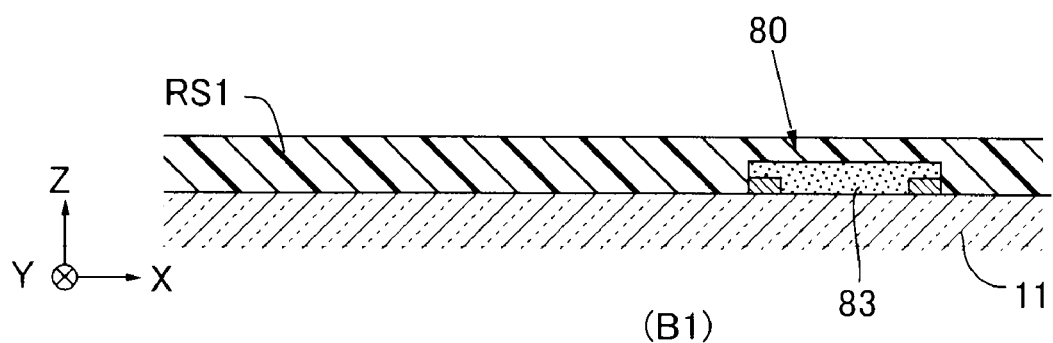
Figure 7:
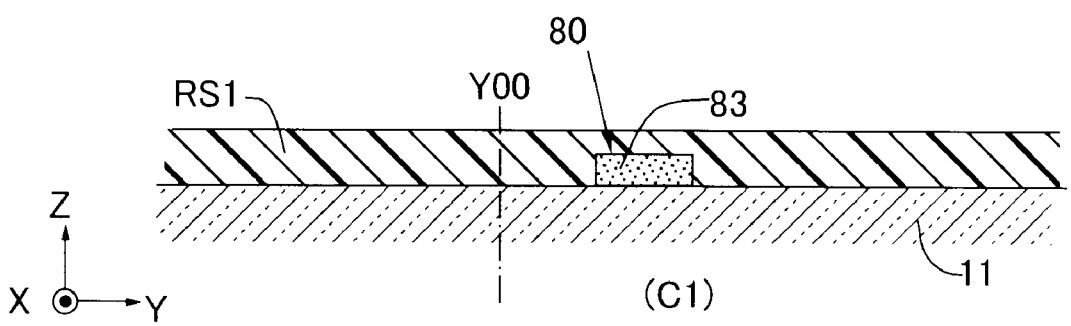

To cover the electrode metallic films 81, 82 and the resistance film 83, then, as shown in FIGS. 7(A1) to 7(C1), an alkali soluble resin film RS1 is applied by a spin coating process or the like onto one side of the first support layer 11 to have a film thickness of 10 to 80 nm and then subjected to baking. Typically, the alkali soluble resin film RS1 is PMGI.

Then, a photolithograph process is performed on the alkali soluble resin film RS1 covering the electrode metallic films 81, 82 and the resistance film 83, thereby forming an opening in which the alkali soluble resin film RS1 does not lie on the electrode metallic films 81, 82 and the resistance film 83. In photolithography for the alkali soluble resin film RS1, for example, exposure can be performed with an i-line and developing can be performed with an alkali solvent. It should be noted that examples of the photoresist to be use in the photolithograph process for the alkali soluble resin film RS1 include an i-line resist, a KrF resist and an ArF resist. The photoresist used for patterning the alkali soluble resin film RS1 can be removed by a solvent. This solvent should be the one not solving the alkali soluble resin film RS1 and is, for example, PGMEA (propyleneglycol monomethyl ether acetate) or the like.

Figure 8:
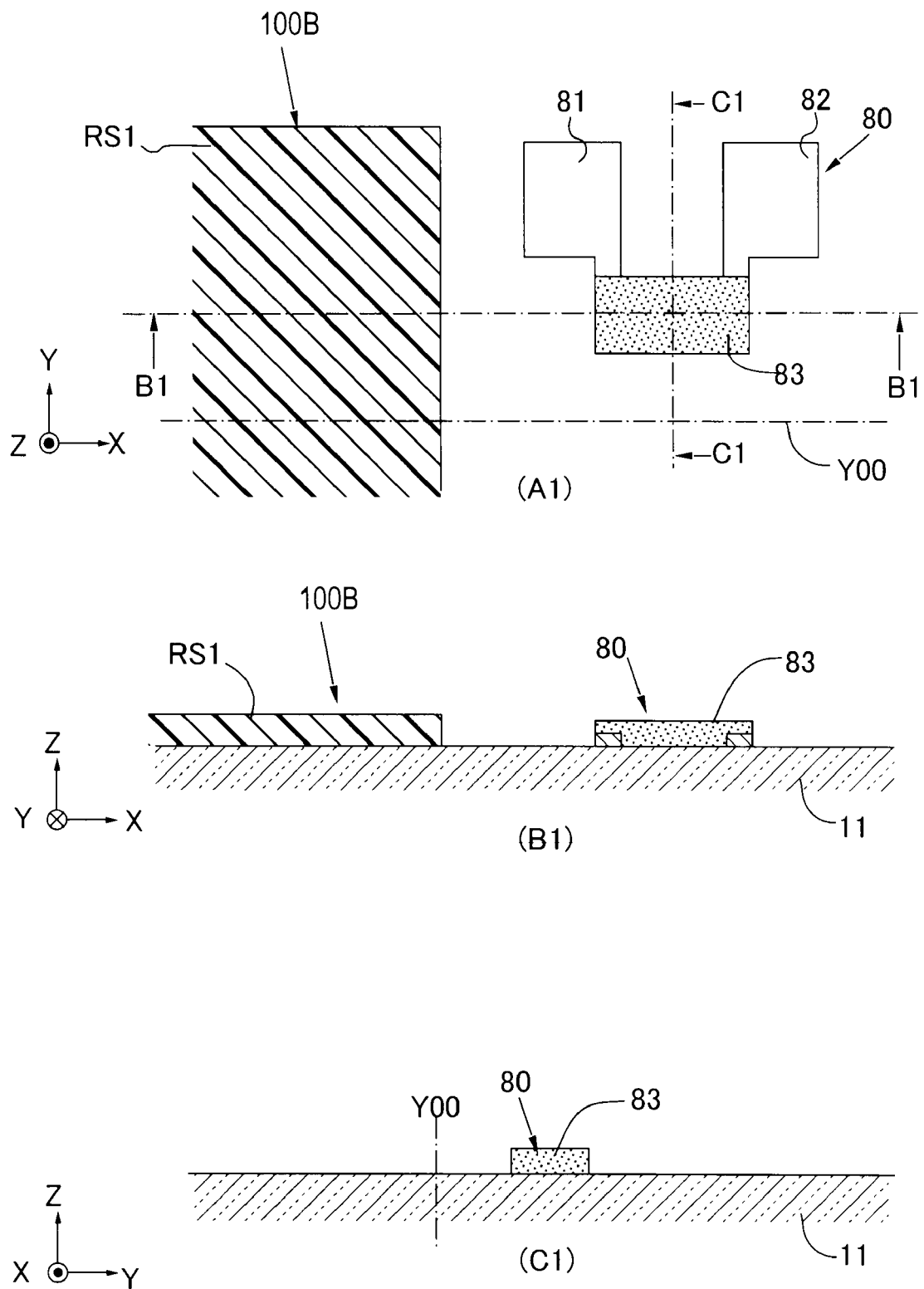
FIG. 8 is a drawing showing a process after the process shown in FIG. 7.

FIG. 8 shows a state after the exposure and developing. The alkali soluble resin film RS1 is left in an area 100B in which the recording head portion is to be formed but not left on the electrode metallic films 81, 82 and the resistance film 83.

Figure 9:
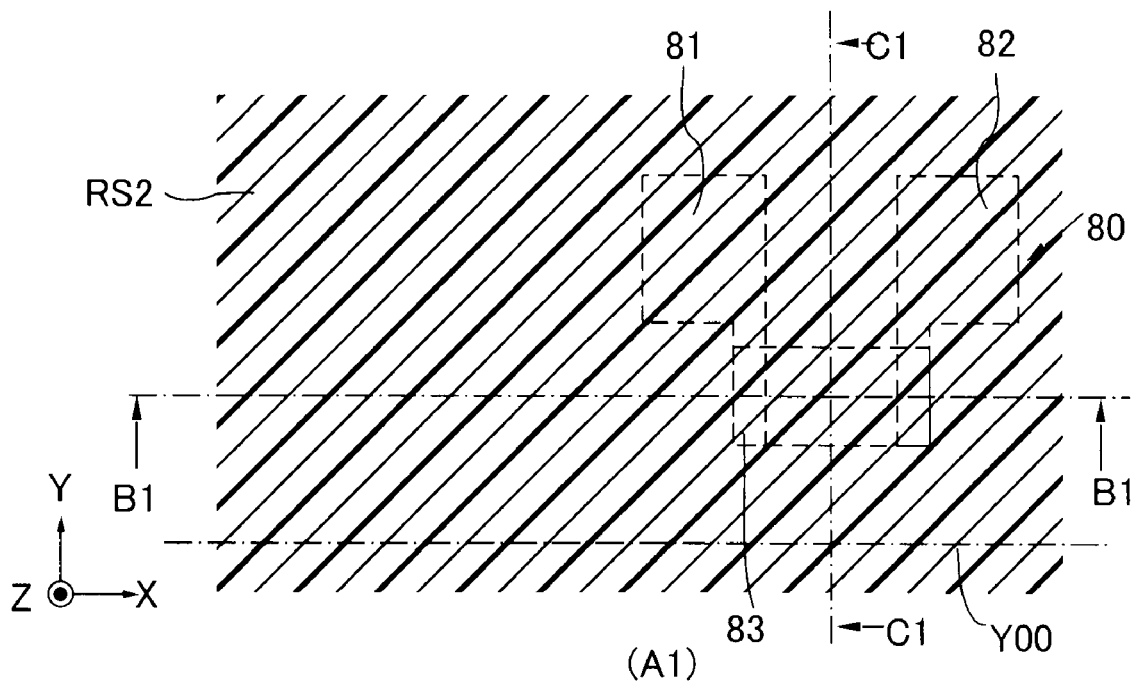
FIG. 9 is a drawing showing a process after the process shown in FIG. 8.
Figure 9:
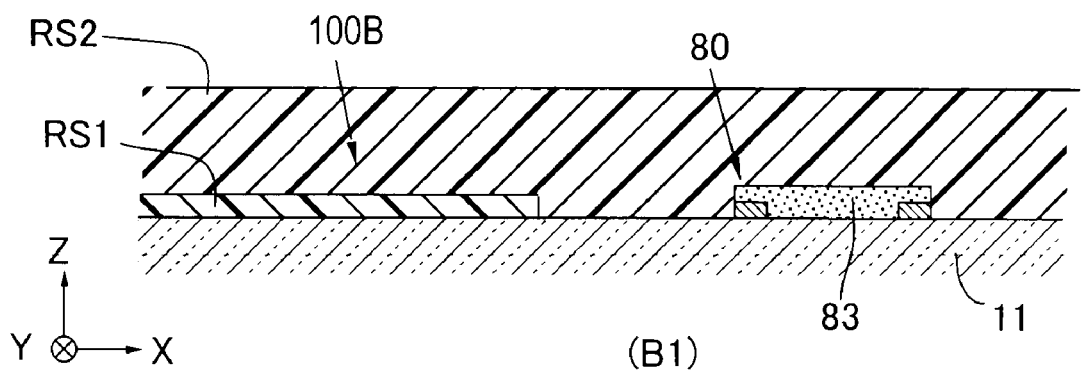
Figure 9:
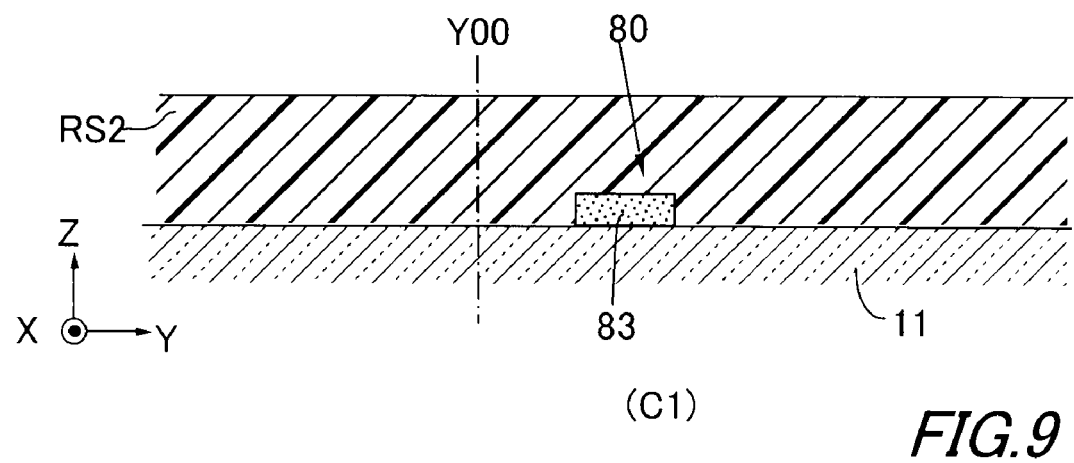

Then, a photoresist film RS2 is applied to continuously cover, as a single layer, the alkali soluble resin film RS1 left in the area 100B in which the recording head portion is to be formed and the electrode metallic films 81, 82 and the resistance film 83, as shown in FIG. 9, followed by exposure and developing. The application, exposure and developing can be continuously performed by an in-line photolithography process using a coater/developer interconnected to a device for exposure. Thus, a resist mask RS2 for defining a main magnetic pole pattern 90 for the recording head portion 100B and a resist mask RS2 for the polishing position sensor are formed as shown in FIG. 10.

Figure 10:
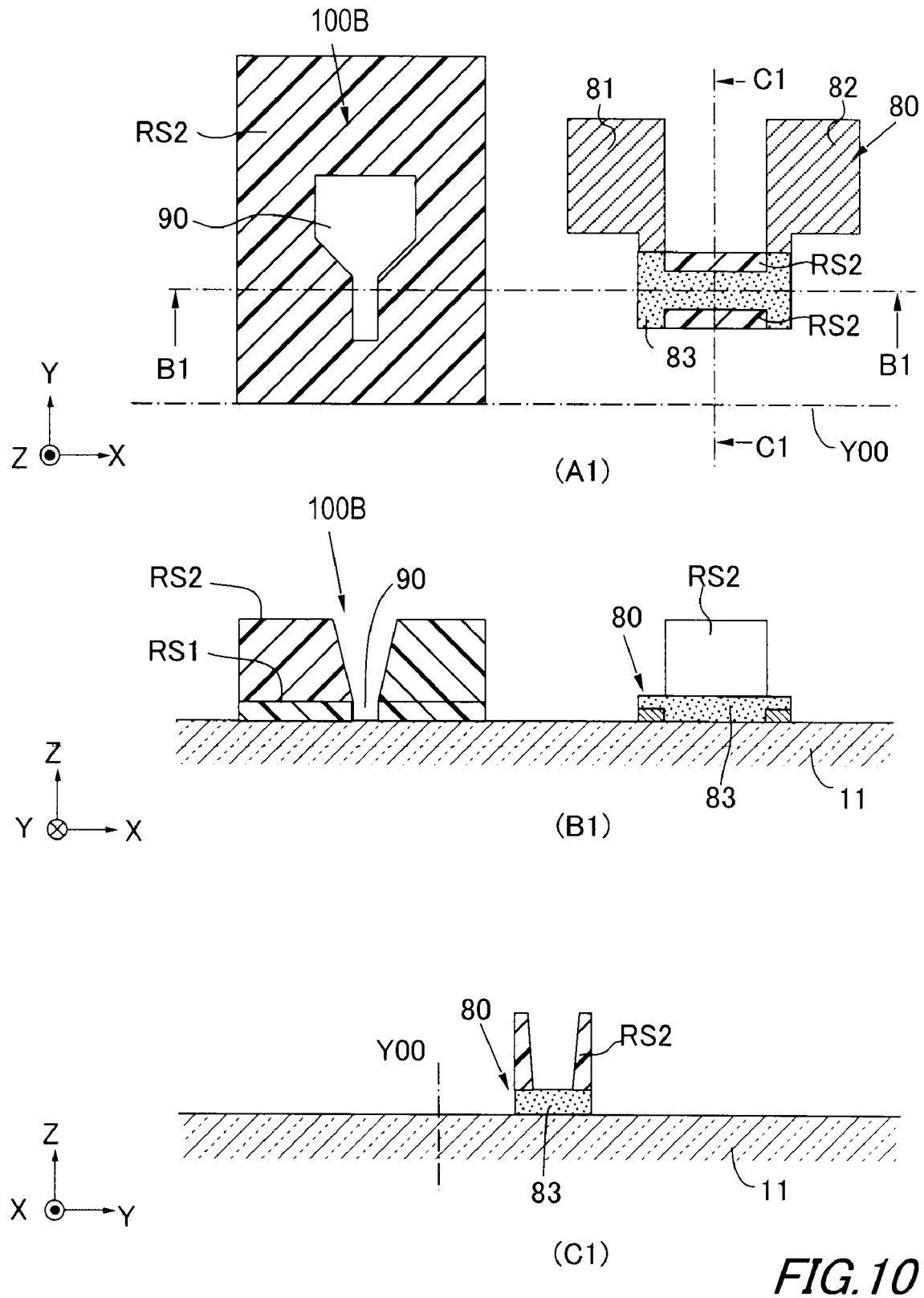
FIG. 10 is a drawing showing a process after the process shown in FIG. 9.

In the area 100B in which the recording head portion is to be formed, as shown in FIG. 10(B1), the inner wall surface of the photoresist film (resist mask) RS2 is inclined at a certain inclination angle, but the alkali soluble resin film RS1 of PMGI is developed such that its inner wall surface extends substantially vertically by appropriately controlling the developing time. Alternatively, an undercut may be formed by increasing the developing time. An undercut length is preferably 0 to 200 nm and more preferably 0 to 100 nm. If it is too long, the sectional area of the magnetic pole is excessively enlarged to increase the possibility of causing a side effect such as adjacent track-erasing or side-erasing. After FIG. 10, for the convenience of description, all figures are described as extending substantially vertically.

Figure 11:
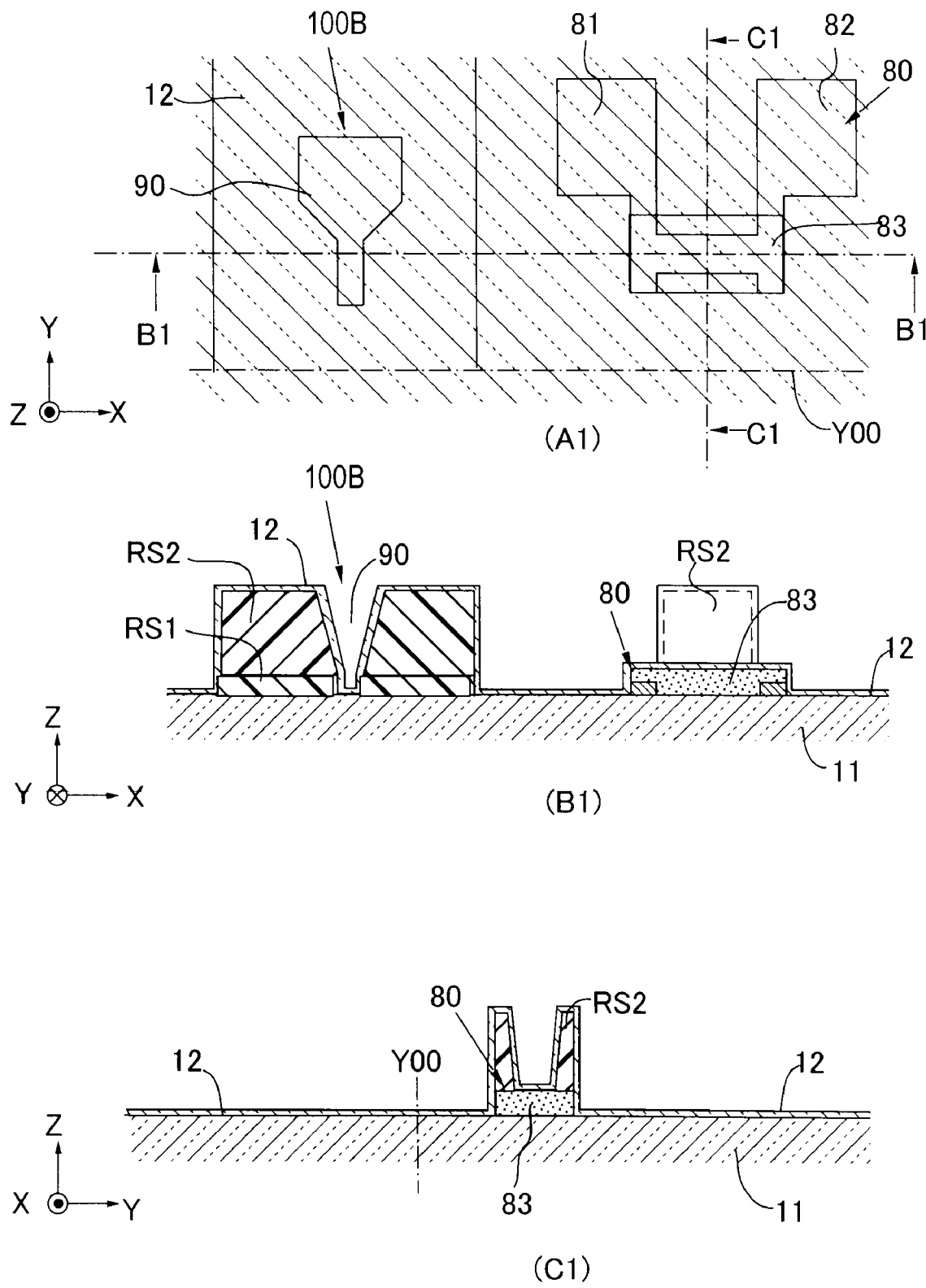
FIG. 11 is a drawing showing a process after the process shown in FIG. 10.

Then, by means of sputtering or the like, a non-magnetic film 12 is formed on the top face and the inner side face of the photoresist film RS2, on the top face of the first support layer 11 exposed within the cut-out pattern, and further on the electrode metallic films 81, 82 and the resistance film 83 constituting the polishing position sensor 80, as shown in FIG. 11. Preferably, the non-magnetic film 12 is $Al_2O_3$ deposited by an ALD process.

Figure 12:
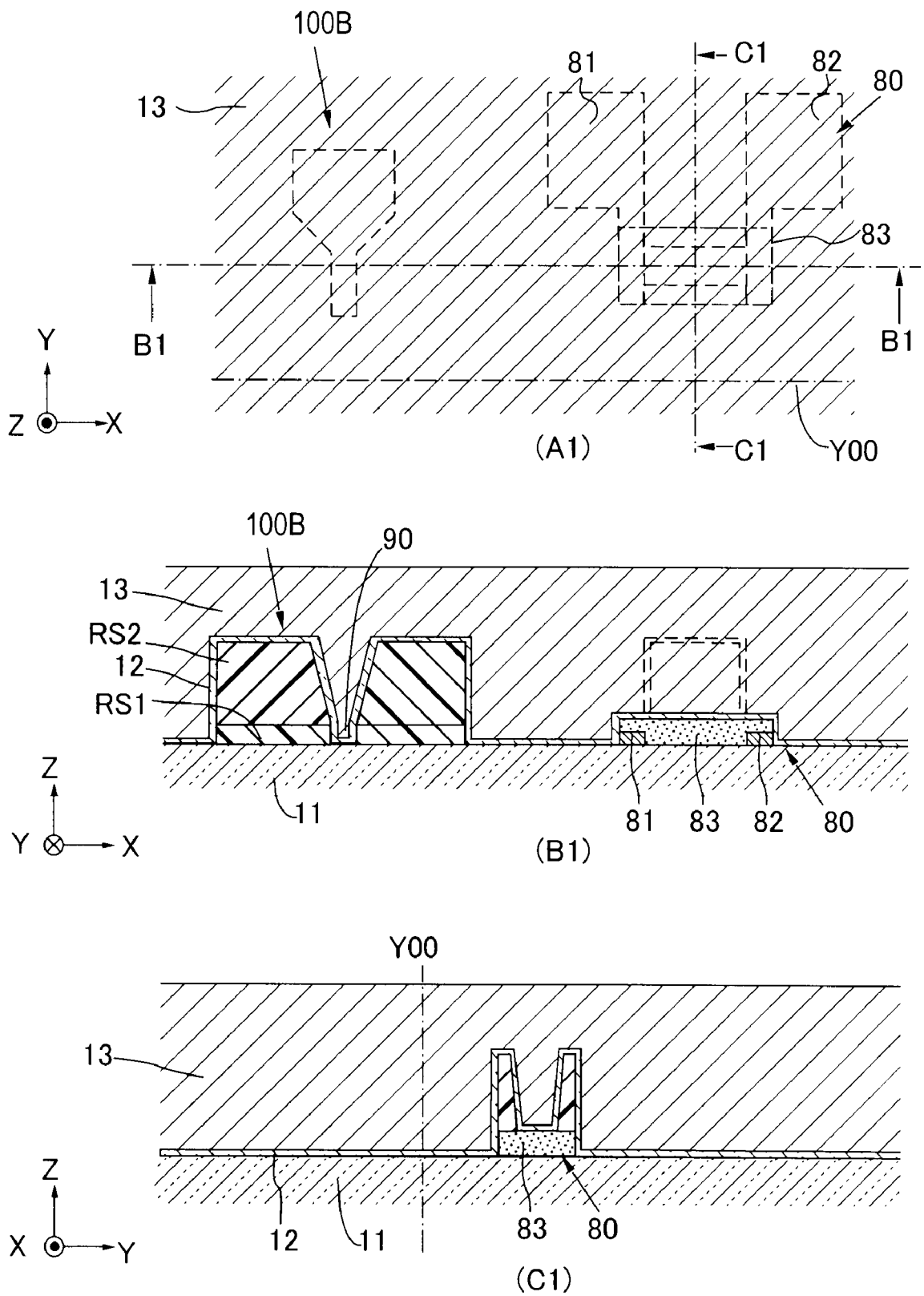
FIG. 12 is a drawing showing a process after the process shown in FIG. 11.
Figure 13:
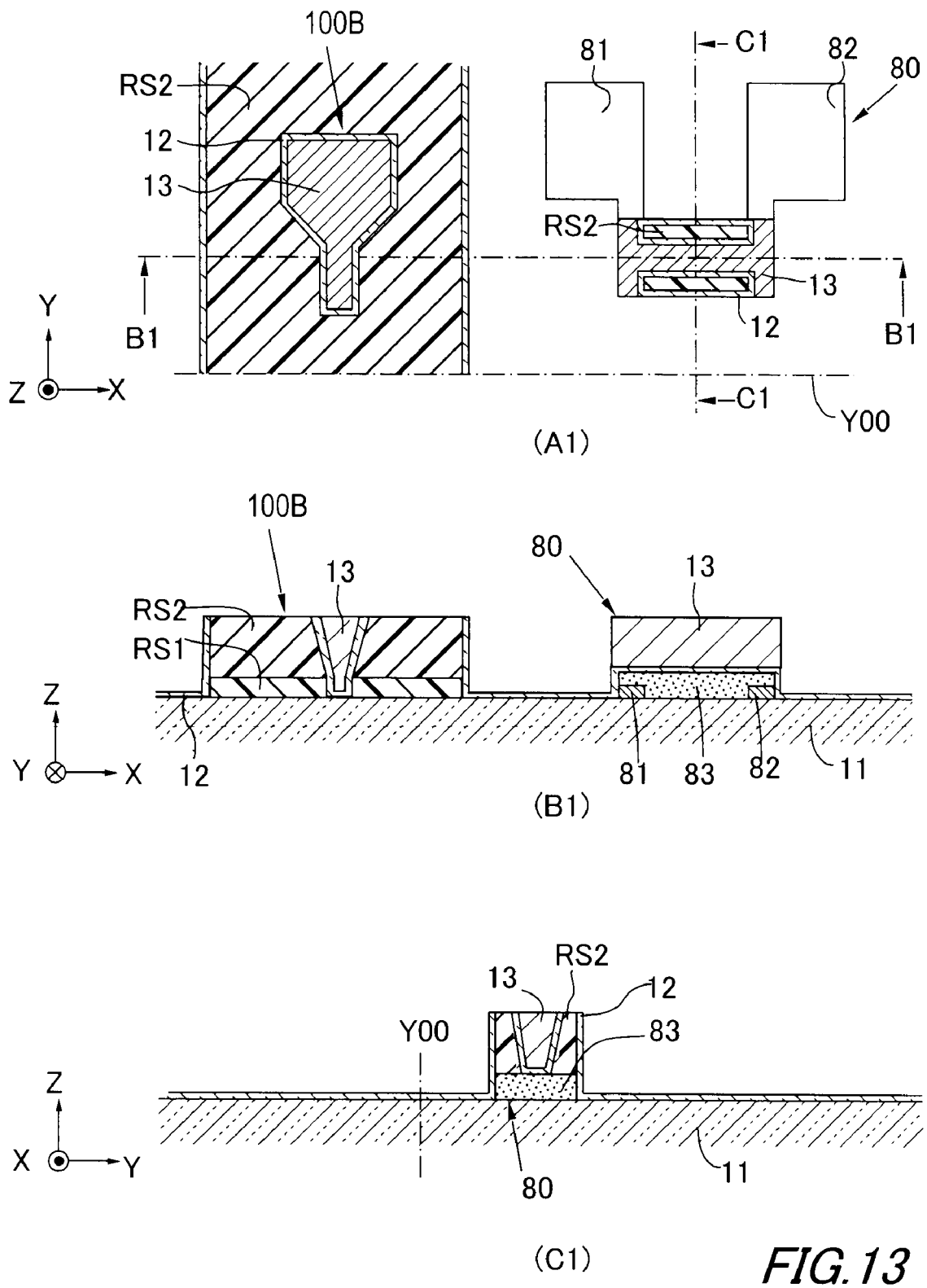
FIG. 13 is a drawing showing a process after the process shown in FIG. 12.

Then, as shown in FIG. 12, a magnetic film 13 which becomes a recording magnetic pole is formed by plating. Then, the surface of the magnetic film 13 is flattened by CMP or the like, and the magnetic film 13 and the non-magnetic film 12 in an unnecessary area are removed, for example, by a milling or wet etching process. FIG. 13 shows a state after those processes.

Figure 14:
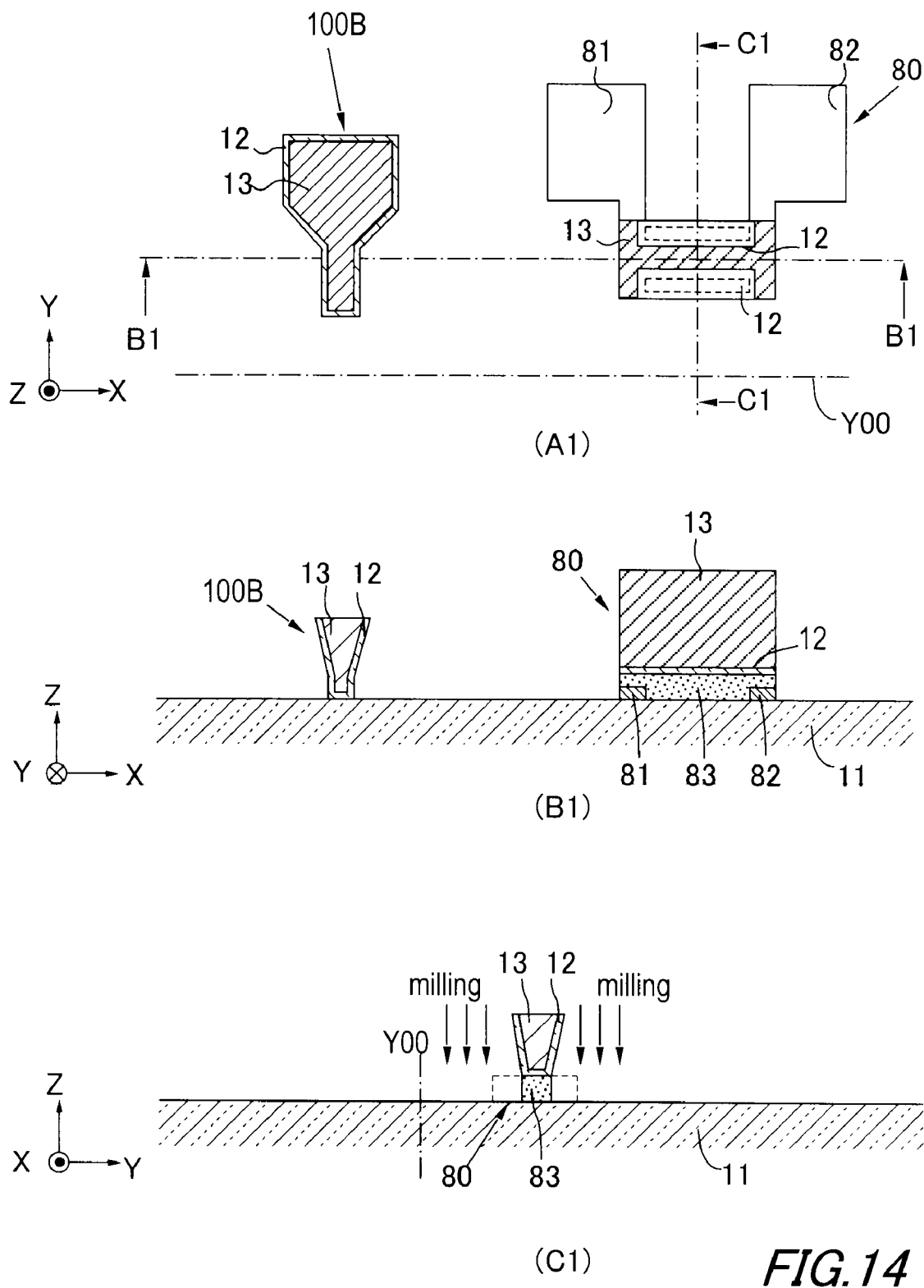
FIG. 14 is a drawing showing a process after the process shown in FIG. 13.

Then, the alkali soluble resin film RS1 and the photoresist film RS2 are removed, as shown in FIG. 14. The PMGI of the alkali soluble resin film RS1 can be peeled off by a photoresist stripper. Then, as shown in FIG. 14(C1), milling is performed on the resistance film 83 of the polishing position sensor 80 with the non-magnetic film 12, which is an ALD film, used as a mask, thereby setting the position of the resistance film 83 in the direction of the Y-axis, i.e., the position of the polishing position sensor 80 in the direction of the Y-axis.

Figure 15:
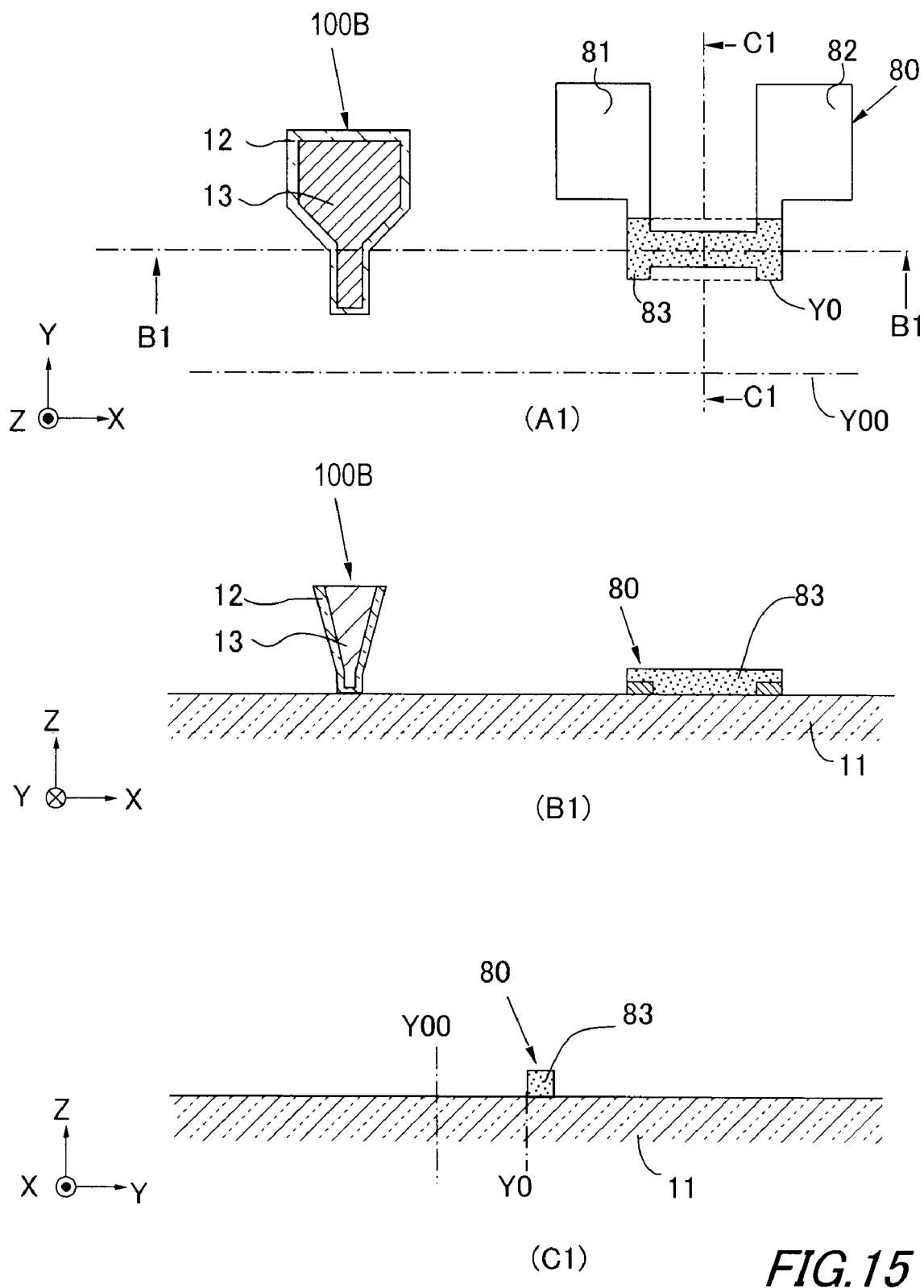
FIG. 15 is a drawing showing a process after the process shown in FIG. 14.

Then, as shown in FIG. 15, the non-magnetic film 12 and the magnetic film 13 are removed from above the resistance film 83 by milling, wet etching or the like.

Figure 16:
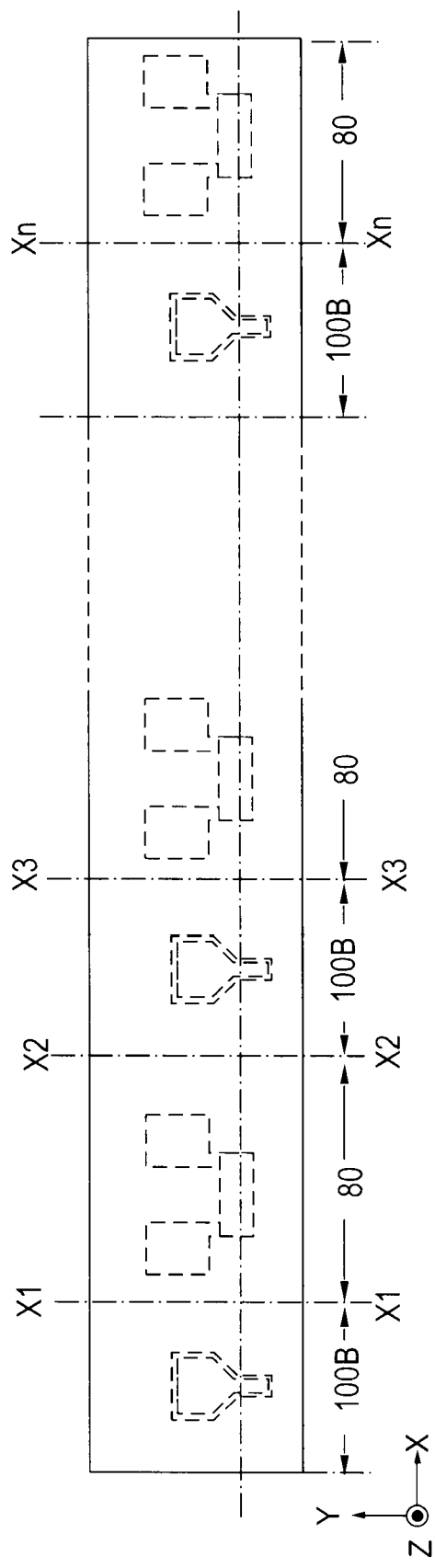
FIG. 16 is a drawing showing a process of polishing a bar having aligned magnetic head elements.
Figure 16:
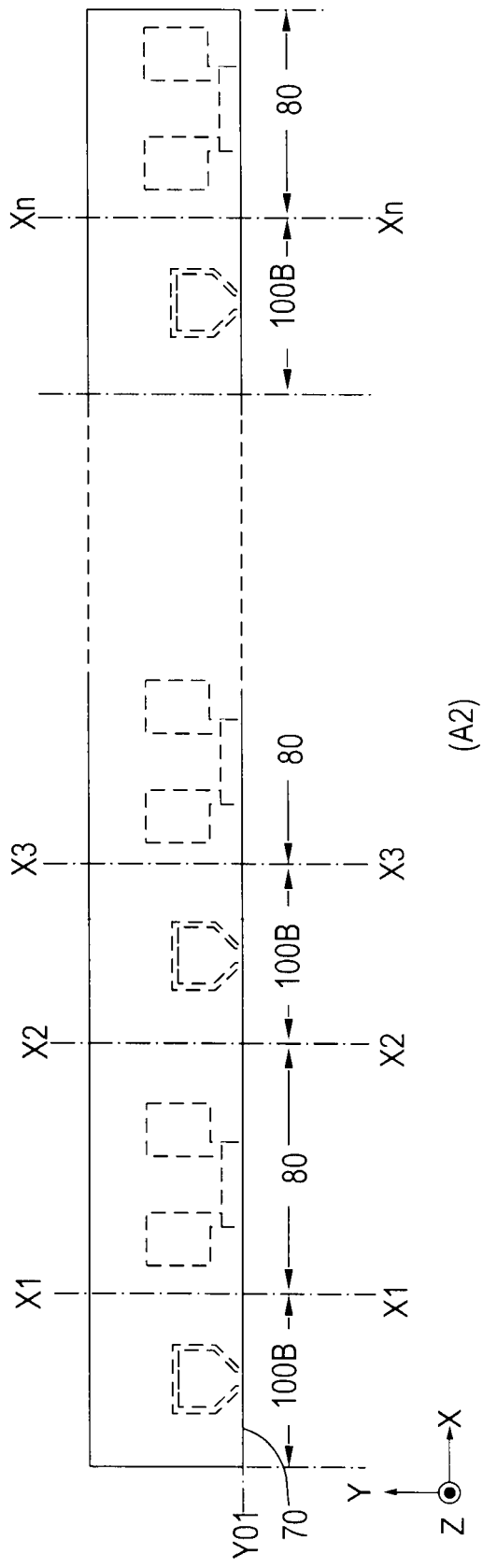

Thereafter, well-known processes are performed to obtain a wafer in which magnetic head elements having the structure shown in FIGS. 1 to 3 are arranged in the form of matrix, for example, in the direction of the X-axis and in the direction of the Y-axis. This wafer is cut to obtain a bar in which pairs of the magnetic head element having the recording head portion 100B and the polishing position sensor 80 are arranged in one direction, as shown in FIG. 16(A1). This bar is polished in the direction of the Y-axis to have a predetermined throat height and MR height, whereby a polished bar having the air bearing surface 70 can be obtained as shown in FIG. 16(A2).

This polishing process is performed while measuring resistance of the polishing position sensor 80. Then, the polishing process is stopped at a position Y01 in the direction of the Y-axis where the resistance of the polishing position sensor 80 reaches a predetermined value. Thus, the throat height in the recording head and the MR height in the reproducing head can be set at a predetermined value. Then, individual sliders having the thin-film magnetic head can be obtained by cutting the bar along cutting lines (X1-X1) to (Xn-Xn) set at intervals in the direction of X-axis.

In the manufacturing method according to the present invention, as understood from the above-described manufacturing processes, since the process of forming the recording head portion 100B has a step of performing a photolithography process on the alkali soluble resin film RS1 and the photoresist film RS2 after applying the alkali soluble resin film RS1 and the photoresist film RS2 in the named order, the sectional area of the magnetic pole film 13 of the recording head portion 100B can be increased by providing the photoresist with a vertical slope at the bottom through the use of the alkali soluble resin film RS1 (see FIGS. 3, 4 and 5).

However, from the viewpoint of the polishing position sensor 80, an undercut means deformation of the polishing position sensor 80 to move the reference point and therefore leads to impairing intended functions of the polishing position sensor 80.

In the manufacturing method according to the present invention, as shown in FIGS. 9 and 10, the process of forming the polishing position sensor 80 has a step of performing a photolithography process on the photoresist film RS2 while having only the photoresist film RS2 out of the alkali soluble resin film RS1 and the photoresist film RS2. Accordingly, the photoresist film RS2 forms a single-layer resist mask. The alkali soluble resin film, which leads to occurrence of an undercut, does not exist. Thus, the position of the polishing position sensor 80 in the direction of the Y-axis can be maintained with high precision.

Figure 17:
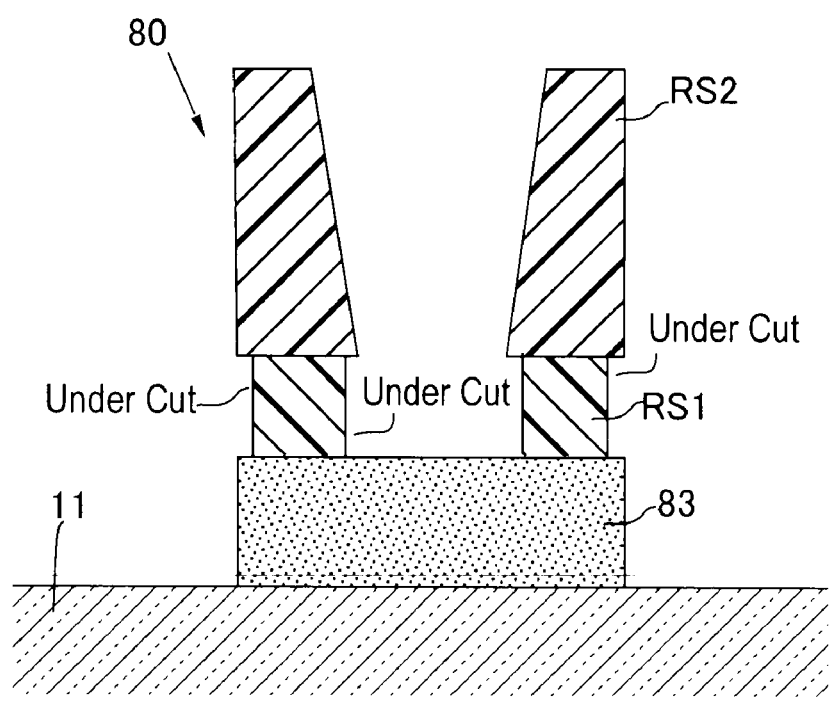
FIG. 17 is a drawing for explaining a problem in a conventional manufacturing method.

If it had a two-layer film structure of the alkali soluble resin film RS1 and the photoresist film RS2, the alkali soluble resin film RS1 would have an undercut, as shown in FIG. 17. The undercut thus formed can be maintained until FIGS. 11 to 14, changing the position of the resistance film 83 in the direction of the Y-axis during the milling of the resistance film 83 in FIG. 14. This problem can be avoided according to the present invention.

In order to provide the photoresist with a vertical surface at the bottom side in FIG. 10(B1), moreover, the developing time is controlled such that the alkali soluble resin film RS1 has an undercut length of 0. In this case, seemingly, the undercut length on the polishing position sensor in FIG. 17 can be estimated to be 0 as well but generally becomes larger than 0. The reason can be explained as follows.

In the vicinity of the main magnetic pole, the exposure pattern is fine and has a size smaller than or nearly equal to an exposure light wavelength. In the polishing position sensor, on the other hand, the adjacent exposure pattern is considerably larger than the exposure light wavelength. In the case where the pattern has a size smaller than or nearly equal to an exposure light wavelength, its potential exposure amount decreases to lower the developing speed of the photoresist. As a result, it takes extra time for the developer to reach the PMGI during the developing as compared with the case where the exposure pattern is considerably larger than the exposure light wavelength. Moreover, the PMGI inherently has a constant rate of solution for the alkali developer regardless of the exposure. Therefore, when the developer reaches the PMGI late, the undercut length becomes small. In the case where the undercut length is 0 in the vicinity of the main magnetic pole, accordingly, the undercut length on the polishing position sensor generally becomes larger than 0.

In the case where the undercut length on the polishing position sensor is 0, moreover, the undercut length becomes negative in the vicinity of the main magnetic pole. That is, the slope of the photoresist cannot be made vertical but inclined, for example, in the same way as ω12 in FIG. 4. Accordingly, it is impossible to achieve the object of increasing the sectional area of the magnetic film according to the present invention.

Furthermore, even if the undercut in the main magnetic pole or on the polishing position sensor can be completely eliminated in some way, the alkali soluble resin film RS1 lying on the polishing sensor leads to variations in the undercut length due to the developing process, causing variations in the sensor position. Thus, the relative position of the polishing position sensor to the head can be maintained with high precision.

According to the present invention, as has been described above, when manufacturing a thin-film magnetic head whose writing performance is improved by suppressing magnetic saturation and unnecessary magnetic flux leakage while preventing side-erasing, it is possible to provide a manufacturing method capable of maintaining the relative position of the polishing position sensor 80 to the head portion with high precision.

The present invention has been described in detail above with reference to preferred embodiments. However, obviously those skilled in the art could easily devise various modifications of the invention based on the technical concepts underlying the invention and teachings disclosed herein.

What is claimed is:

1. A method for manufacturing a thin-film magnetic head comprising
    processes of forming a polishing position sensor and a recording head portion alongside on one side of a wafer,
    the process of forming the recording head portion having a step of performing a photolithography process after applying an alkali soluble resin film and a photoresist film in the named order,
    the process of forming the polishing position sensor having a step of performing a photolithography process on the photoresist film while having only the photoresist film out of the alkali soluble resin film and the photoresist film.

2. The method of claim 1, wherein after forming the alkali soluble resin film, the process of forming the polishing position sensor has a step of removing the alkali soluble resin film above a plating seed layer and a resistance film and then applying the photoresist film.

3. The manufacturing method of claim 1, wherein the alkali soluble resin film is a PMGI film.

* * * * *